US005386709A

United States Patent [19]
Aaron

[11] Patent Number: 5,386,709
[45] Date of Patent: Feb. 7, 1995

[54] SUBCOOLING AND PROPORTIONAL CONTROL OF SUBCOOLING OF LIQUID REFRIGERANT CIRCUITS WITH THERMAL STORAGE OR LOW TEMPERATURE RESERVOIRS

[75] Inventor: David A. Aaron, Reisterstown, Md.

[73] Assignee: Baltimore Aircoil Company, Inc., Jessup, Md.

[21] Appl. No.: 988,547

[22] Filed: Dec. 10, 1992

[51] Int. Cl.⁶ .............................. F25B 7/00; F25B 1/00
[52] U.S. Cl. .......................................... 62/199; 62/79; 62/335
[58] Field of Search .................. 62/199, 79, 498, 335, 62/59

[56] References Cited

U.S. PATENT DOCUMENTS

| | | | |
|---|---|---|---|
| 1,523,112 | 1/1925 | Fitzgerald | 62/201 |
| 1,782,651 | 11/1930 | Hoffman | 62/201 |
| 2,120,185 | 6/1938 | Philipp | 62/201 |
| 2,460,623 | 2/1949 | Di Zoppola | 62/134 |
| 2,712,732 | 7/1955 | McGrew | 62/4 |
| 4,302,944 | 12/1981 | Gainer | 62/59 |
| 4,373,346 | 2/1983 | Hebert et al. | 62/79 |
| 4,409,796 | 10/1983 | Fisher | 62/160 |
| 4,493,193 | 1/1985 | Fisher | 62/160 |
| 4,553,401 | 11/1985 | Fisher | 62/160 |
| 4,637,219 | 1/1987 | Grose | 62/199 |
| 4,720,984 | 1/1988 | Ames | 62/434 |
| 4,964,279 | 10/1990 | Osborne | 62/59 |
| 4,966,007 | 10/1990 | Osborne | 62/101 |
| 5,038,574 | 8/1991 | Osborne | 62/101 |
| 5,150,581 | 9/1992 | Smith | 62/115 |
| 5,183,100 | 2/1993 | Harrell, Jr. | 62/260 |

OTHER PUBLICATIONS

Brochure—"Supermarket Air Conditioning and Dehumidification"—Electric Power Research Institute.
"Two-Stage System Uses R-22"-Gordon Duffy and Ed Bas; from Air Conditioning, Heating & Refrigeration News; Aug. 17, 1992.

Primary Examiner—William E. Wayne
Attorney, Agent, or Firm—Edward J. Brosius; F. S. Gregorczyk; Thomas J. Schab

[57] ABSTRACT

The present invention provides method and apparatus for incorporating thermal storage and other low-temperature reservoirs with new or retrofittable refrigerant circuit devices to increase their thermal operating capacity and efficiency by subcooling refrigerant condensate with subcoolers, as illustrated in a plurality of structural arrangements, which allows simultaneous cooling of a refrigerated volume and recharging of the thermal storage system, and further, it may utilize proportional subcooling to proportionally control evaporator capacity.

24 Claims, 10 Drawing Sheets

FIG. 5  10°F LIQUID TEMP VS 110°F LIQUID TEMP

SUBCOOLING AND PROPORTIONAL CONTROL OF SUBCOOLING OF LIQUID REFRIGERANT CIRCUITS WITH THERMAL STORAGE OR LOW TEMPERATURE RESERVOIRS

BACKGROUND OF THE INVENTION

The present invention relates to a system operable with air-conditioning and refrigeration equipment. More specifically, the system provides a method and apparatus for coupling a thermal storage system, such as an ice-storage apparatus or other low-temperature reservoir, to existing cooling refrigeration devices to enhance their performance and efficiency; reduce input energy at the same operating capacity or expand the operating cooling capacity at the same energy input; and, to particularly reduce power demand at "peak operating or usage periods" noted by power generating operators. The system is also adaptable to new installations for realization of similar benefits for the "design" capacity of such new installations.

An illustration and explanation of the need for expansion of the range of existing cooling devices is provided in a brochure from the Electric Power Research Institute, "Supermarket Air Conditioning and Dehumidification". The modern convenience of the grocery store or supermarket with its air-conditioned aisles, glassed or open-front freezers and display cases, and its cold-storage lockers is accepted and expected by consumers. However, the costs to install, operate and maintain these several, usually large, cooling and refrigeration apparatus are significant. Several alternative systems for supermarket cooling requirements are illustrated and discussed in the above-noted brochure, which suggestions include notations on capital and operating costs, as well as a discussion of the relative advantages and disadvantages of the several systems. In this brochure, the utilization of an ice-storage or cool storage system is briefly discussed, however, there is no illustration or description of an operable system, only a recognition of the potential benefits from such a system.

Conventional cooling apparatus generally consists of stand alone devices, such as air-conditioners, and individual assemblies, each having its own cooling circuit, power connections and ductwork for air transfer. The coupling of an ice-storage apparatus, or other low-temperature reservoir as compared to the ambient environment temperature reservoir, to an existing cooling unit can reduce its period of operation to attain the same cooling capacity, thus reducing its energy consumption during a peak electrical cost period, for example; or alternatively, it can be viewed that the operating range of the unit is expanded, which results in a "larger cooling capacity" unit without replacement of existing equipment. In addition, utilization of the ice-storage apparatus can reduce input energy at the same or increased output cooling capacity. Further, multiple cooling devices can be connected to this noted thermal storage system or low-temperature reservoir for simultaneous operation therewith. Illustrative of a familiar facility with multiple cooling or refrigerant utilizing devices is the above-noted supermarket or grocery store, which commercial facilities frequently have air-conditioning apparatus, freezers or coolers with a door for goods, such as ice-cream, open coolers for dairy products and frozen juices, and sub-zero coolers for storage of other foodstuffs. In a new installation, the size and configuration of some or all of the ancillary cooling-type devices coupled to an ice-storage system, low-temperature reservoir or other thermal storage arrangement can be reduced in size or rated capacity to deliver the required cooling capacity associated with cooling/refrigeration systems, which may generally include or incorporate compressors, condensers, cooling towers and other apparatus without a thermal storage system. However, the "rated capacity" of a standard cooling/refrigeration system required to achieve the same cooling capacity of a system coupled to a thermal storage system will be greater, and, as a consequence, the requisite capital expenditure for such a cooling system would be expected to be greater. Arguably the capital cost of the thermal storage system would offset any capital savings associated with the smaller heat exchange system, however, the operating cost is demonstrably lower for the thermal storage/heat exchange system. Alternatively, a smaller input energy could be utilized to obtain the same or greater "rated or design" capacity.

This above-noted reduced operating cost is reflective of lower input energy requirements for the cooling/refrigeration system to operate at a prerequisite cooling capacity. The necessity for such lower operating conditions and costs is an ever-increasing consideration for any power-using operation, as the consumable parameter, usually electrical energy, has continually increased in cost, while its relative availability is diminishing. As an example, the increasing frequency of "brown-outs" in certain sections of the United States illustrates the lack of available power to keep up with the increased consumer demand especially during the midafternoon period of warm summer months. In addition, the ability to expand or couple the usage of an ice-storage system to several parasitic apparatus; the ability for thermal storage potential during off-peak-usage periods of electrical power usage would result in reduced power costs to provide cooling capacity at the same cooling demand level; and, the relatively nominal capital cost of thermal storage equipment in comparison to other cooling equipment are all factors weighing in favor of the consideration of coupling thermal storage equipment with extant cooling systems.

SUMMARY OF THE INVENTION

The present invention provides an assembly for coupling a refrigerant circuit to a subcooling apparatus for reduction of the liquid condensate temperature, which will expand refrigerant-circuit thermal capacity while maintaining system energy requirements during input-energy, peak-demand periods at pre-subcooling demand levels. In the examples below, the refrigerant circuits are usually coupled to or operable with equipment such as freezers, coolers and "air-conditioning" apparatus. This latter term may reflect the fact that the broad generic term encompasses air treatment for environments that are not necessarily coupled to refrigerant circuits, such as circuits for the removal of air-entrained solids (e.g., dust and pollen). However, the present invention refers to those apparatus including a refrigerant circuit.

In a preferred embodiment of the invention, a subcooler is coupled between and operable with a refrigerant circuit of a cooling or freezing device and a thermal storage system. The structure includes an apparatus for transfer of the cooling media of the thermal storage system to the subcooler for heat exchange with the refrigerant circuit fluid, which refrigerant circuit is also coupled to the subcooler for heat exchange. In fact, this arrangement is expandable to couple several alternative refrigerant-circuit apparatus, either alone or in combination, with the thermal storage system. In the aforementioned supermarket example, these coupled apparatus can include, but are not limited to an air-conditioning (dehumidification) device, a sub-zero freezer, a cooler, a combination of these and other assemblies or a multiplicity of several of these devices.

In a further embodiment of the present invention, a control assembly for proportional control of the temperature of liquid condensate discharged from the subcooler or the amount of system subcooling is provided by controlling the rate of fluid flow between the subcooling appartatus of each assembly connected to the thermal storage system in the circuits. These control arrangements are separably operable to provide fluid flow control and thus, for regulating the subcooling capacity and consequently the cooling capacity of each of the coupled cooling/refrigeration apparatus. Among the readily apparent advantages of such proportional control are the following: (1) matching evaporator capacity to evaporator load; (2) attaining optimal system performance; (3) reducing the amounts of energy usage based on local electrical rate structures; (4) reducing or eliminating undesired compressor cycling; (5) allowing constant humidity removal; (6)achieving lower starting electrical loads; (7) increasing compressor life; (8) reducing or eliminating refrigerant migration during off-cycles; and, (9) reducing refrigerant apparatus maintenance from compressor short-cycling and refrigerant migration.

It is anticipated and can be demonstrated that the subcooling apparatus of the present invention is operable with any presently available refrigerant fluid. The increased thermal performance in an evaporator is dependent upon the type of refrigerant in the circuit, but the resultant fact of the improvements attributable to subcooling the refrigerant and the utilization of the apparatus, and the method of the present invention, are clearly demonstrable.

BRIEF DESCRIPTION OF THE DRAWING

In the Figures of the Drawings, like reference numerals identify like components, and in the drawings.

DETAILED DESCRIPTION OF THE INVENTION

Figure 1:
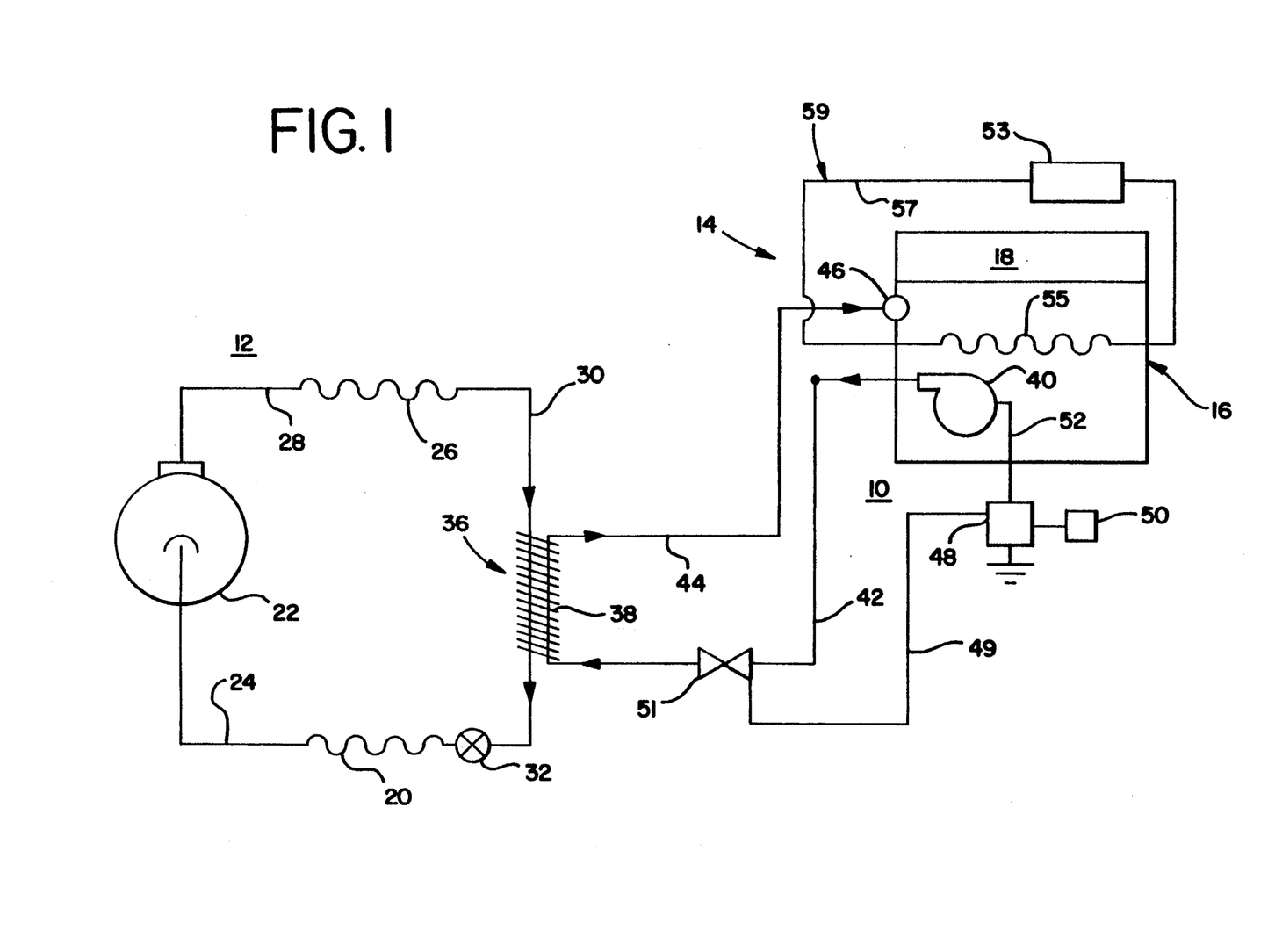
FIG. 1 is a schematic illustration of a thermal storage system and subcooler coupled with a refrigeration circuit.
Figure 1A:
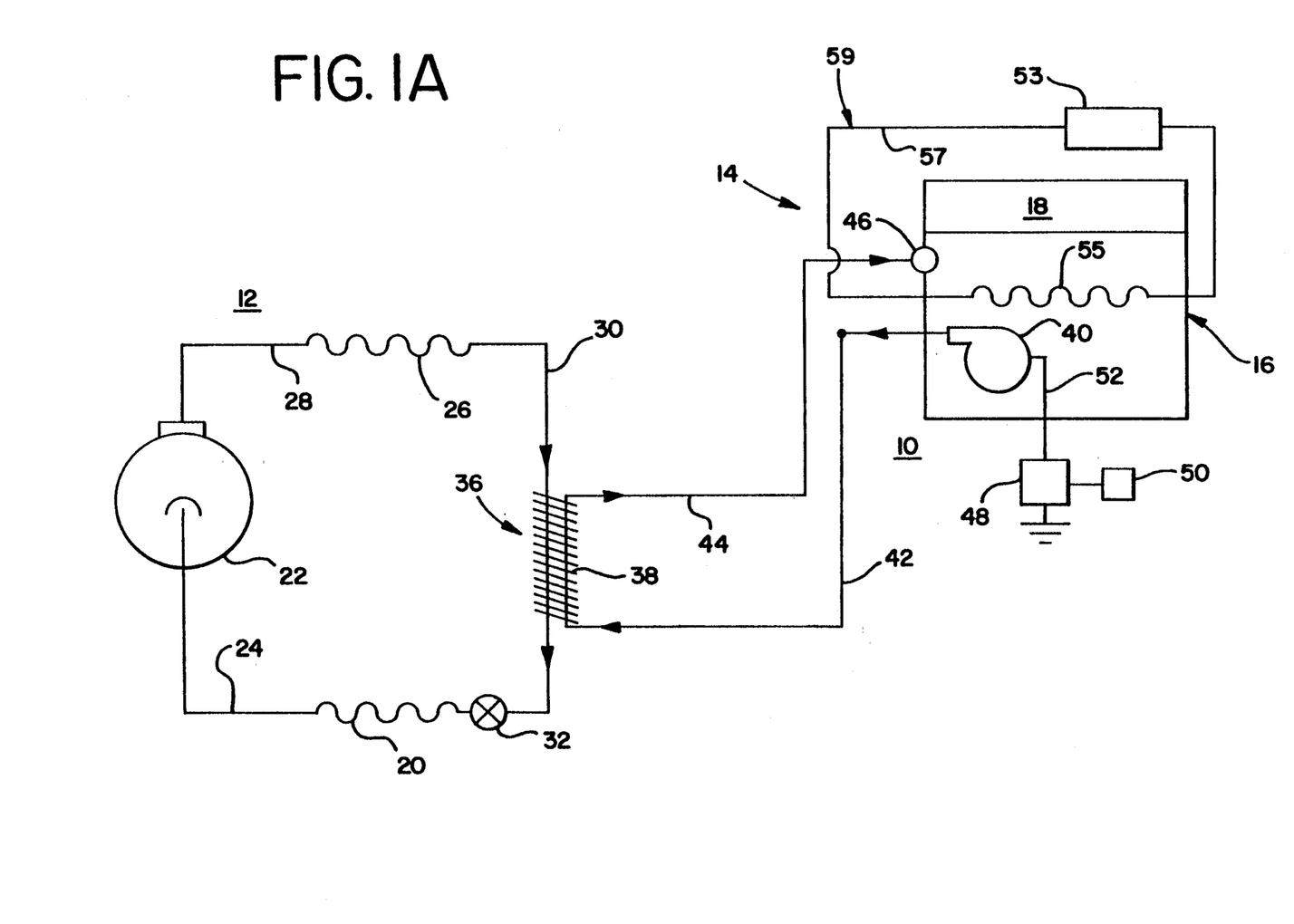
FIG. 1A is a schematic illustration of the thermal storage system and subcooler arrangement of FIG. 1, further including a control valve.

In FIG. 1, an assembly 10 for subcooling the liquid condensate of a refrigerant circuit 12 includes thermal storage system 14, which is shown as housing 16 with cavity 18 having a cooling media therein, such media may, for example, be water or a water-glycol solution. Refrigerant circuit 12 has evaporator 20 connected to compressor 22 by conduit 24 to provide low-pressure refrigerant, which is usually a vapor, to compressor 22. Condenser 26 is coupled in circuit 12 downstream of compressor 22 and generally receives a high or higher pressure refrigerant vapor through conduit 28 for condensing a refrigerant. It is known that the refrigerant fluid communicated downstream from condenser 26 may include entrained vapor, but as a practical matter this vapor is negligible and not relevant to the function of the present invention. Although the embodiment of FIG. 2 includes receiver 124 downstream of condenser 120, as known in the art, the present invention is operable in refrigerant circuits with or without such receivers, as shown in FIG. 1. The refrigerant is communicated to evaporator 20 through conduit 30, which conduit may have expansion device 32, such as a thermal expansion valve (TXV), upstream of evaporator device 20. In the schematic illustration of FIG. 1, subcooler 36 is coupled to conduit 30 between condenser 26 and expansion device 32 to reduce the refrigerant condensate temperature, and discharge the condensate to expansion device 32 for expansion of refrigerant communicated to evaporator 20. Evaporator 20 and condenser 26 may be selected from among air-cooled, evaporatively-cooled and water-cooled structures, which are design choices and not a limitation to the present invention.

Pump 40 is shown as positioned in housing 16 of thermal storage system 14 for illustrative purposes, however, as a practical matter it can be expected that pump 40 would be connected to a discharge port (not shown in this figure) of housing 16 for communication of fluid media at a temperature lower than the ambient temperature associated with condenser 26. Thermal storage systems or apparatus 14, for example, may include ice-storage vessels. In a thermal storage systems, ice may be formed on coils coupled to a refrigerant circuit and positioned in cavity 18, which ice or chilled media is formed for retention, until a coupled thermal using apparatus, such as a freezer or air-conditioning unit, provides a demand for its stored capacity. An example of the utilization of thermal storage equipment is an ice storage assembly coupled to air-conditioning units, which are most generally used in commercial facilities, such as office buildings and warehouses. In FIG. 1, pump 40 is operable with or connected to subcooler 36 by conduit 42 to communicate chilled media fluid, which may also be a slush-like slurry or suspension having both solid and liquid media fluid, to subcooler 36. In the illustration, fluid communicates through subcooler 36 for return at vessel 16 at entry port 46. In subcooler 36 of FIG. 1, the opposed flow of refrigerant fluid in conduit 30 exchanges heat with media fluid flowing in conduit 42. In the case of a refrigerant circuit, the interaction of the fluids and the heat exchange reduces the temperature of the condensed refrigerant liquid communicated to expansion device 32 and evaporator 20.

Pump 40 in FIG. 1 is connected by line 52 to actuation apparatus 48, such as a switch, which may be either manually or automatically operable, to actuate pump 40. In the automatic mode, sensor 50 is operable to sense an operating condition and communicate a sensed signal to apparatus 48 to actuate pump 40. This sensor may include devices such as a timer or thermostat. The illustrated sensing and actuation apparatus is merely illustrative and not a limitation. In addition, apparatus 48 may also control the flow rate of pump 40 to control the degree of subcooling, and thus control the cooling capacity of evaporator 20. Alternatively, a flow control valve 51, which is shown in dashed line, may be provided in line 42 or 44 to control the fluid flow in the subcooling circuit.

Figure 2:
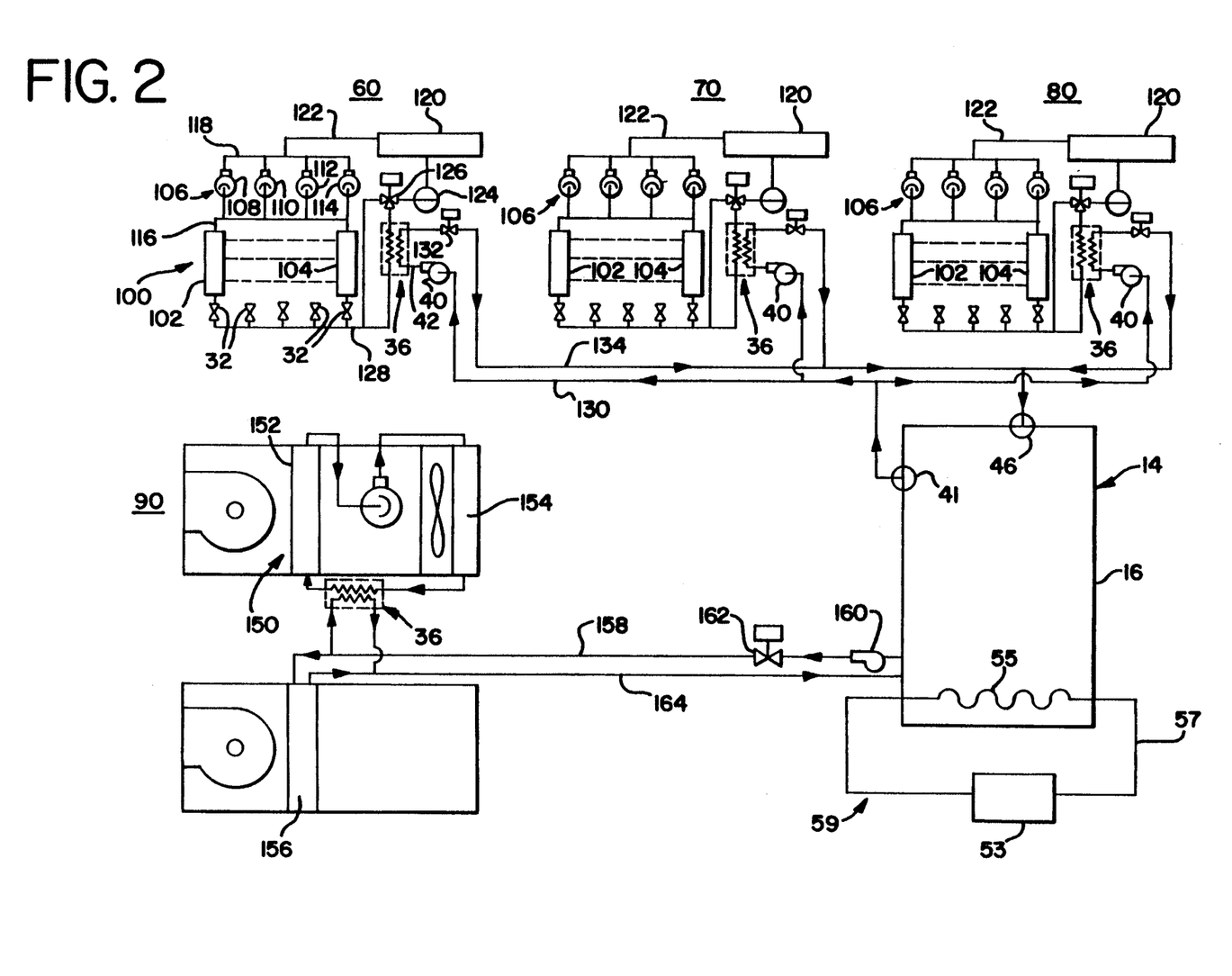
FIG. 2 is a schematic illustration of a thermal storage system coupled to a plurality of refrigerant circuits having a subcooler.
Figure 3:
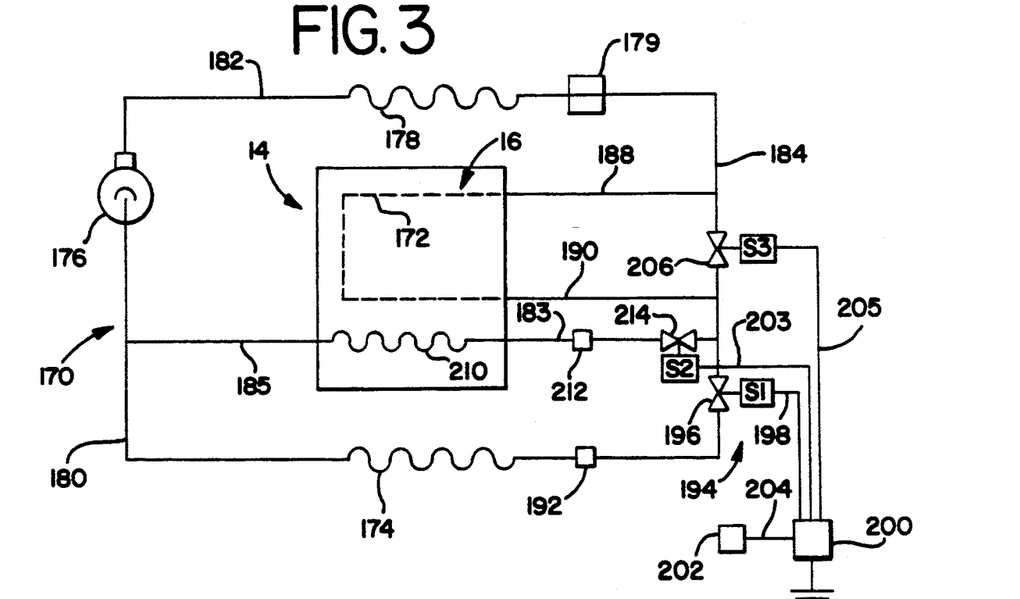
FIG. 3 is a schematic illustration of an apparatus to charge a thermal storage system, which is capable of simultaneously subcooling, charging the thermal storage system and cooling the media therein.
Figure 12:
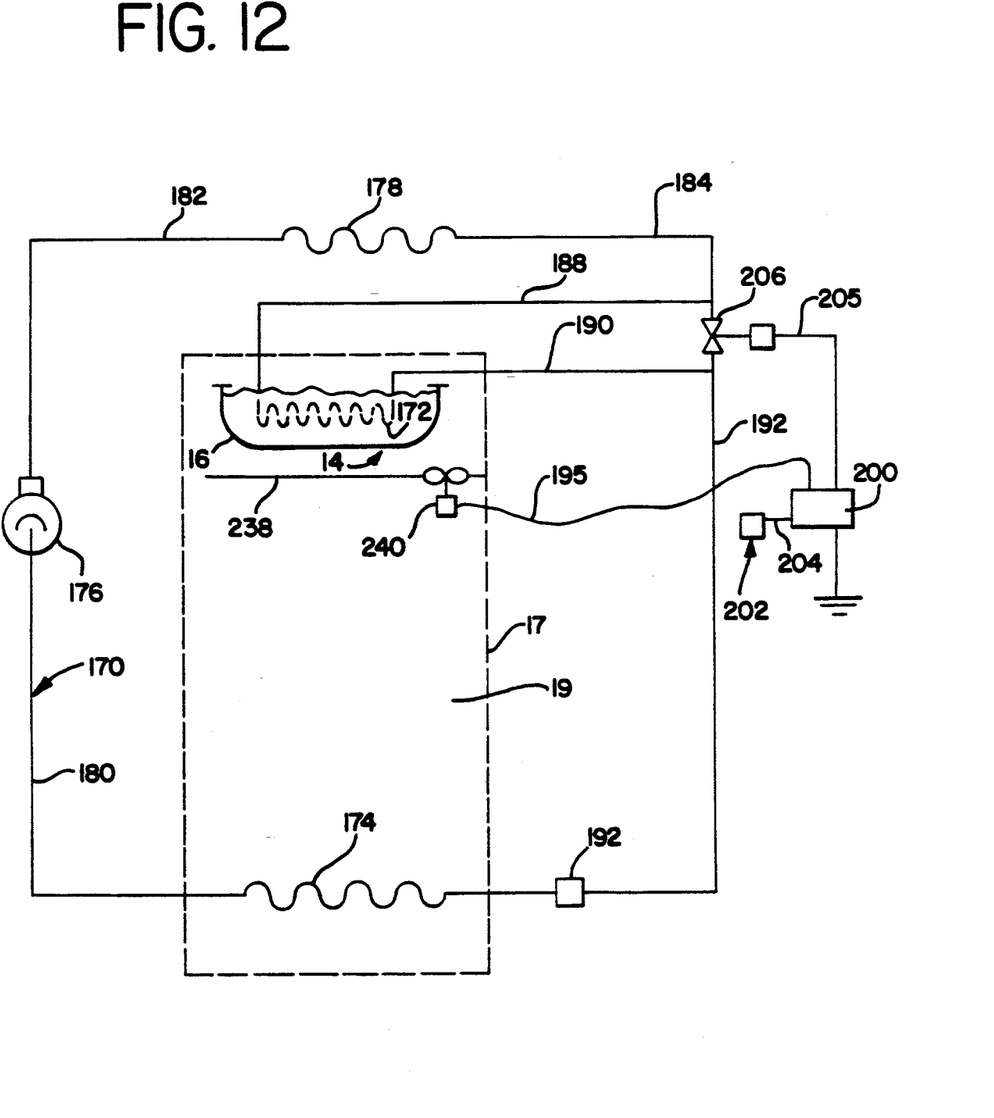

In FIGS. 1 and 2, recharging or regenerating circuit 59 is shown with coil 55 in cavity 18 of thermal storage unit 14. Circuit 59 has refrigeration unit 53, as known in the art, coupled to coil 55 to recharge unit 14 and regenerate thermal storage media. This is shown a stand-alone unit, but it is immaterial what type of thermal storage unit is utilized, as they are known in the art. A second and integral thermal storage regenerating system is shown in FIG. 3 and 12, and will be discussed below, and in the system it is connected to the extant refrigerant circuit.

In this basic embodiment, storage media in cavity 18 may be water, which can be at least partially frozen during periods of reduced power cost or reduced loads, which are generally the nighttime hours referred to as off-peak hours. The frozen water or ice is regarded as a thermal storage media, and generally has a mixture of liquid water and ice surrounding the coils of the ice thermal storage system. Simultaneously with the off-peak hour ice generation, it is noted that the refrigeration demand of the refrigeration equipment may be reduced as the temperature of the outside environment generally decreases at night. In the above-noted supermarket illustration, power demands are also generally lower as the activity in most commercial facilities decreases along with nightfall and, the concurrent environmental temperature decrease and the reduced usage of the refrigerated equipment by consumers. It is noted that in this sequence of events the standard refrigeration equipment is usually able to maintain the desired evaporator temperature with little or no external assistance, such as from thermal storage system 14, beyond normal circuit 12 component operation. However, during this time period the cost of power, that is electrical energy measured in kilowatt-hours, is usually at its lowest level. At this low-cost energy period, power is generally most readily available from the power companies. Therefore, it is advantageous to the commercial user of refrigeration and refrigeration equipment to "store thermal energy", such as with the ice-thermal storage in the example of FIG. 1.

Figure 5:
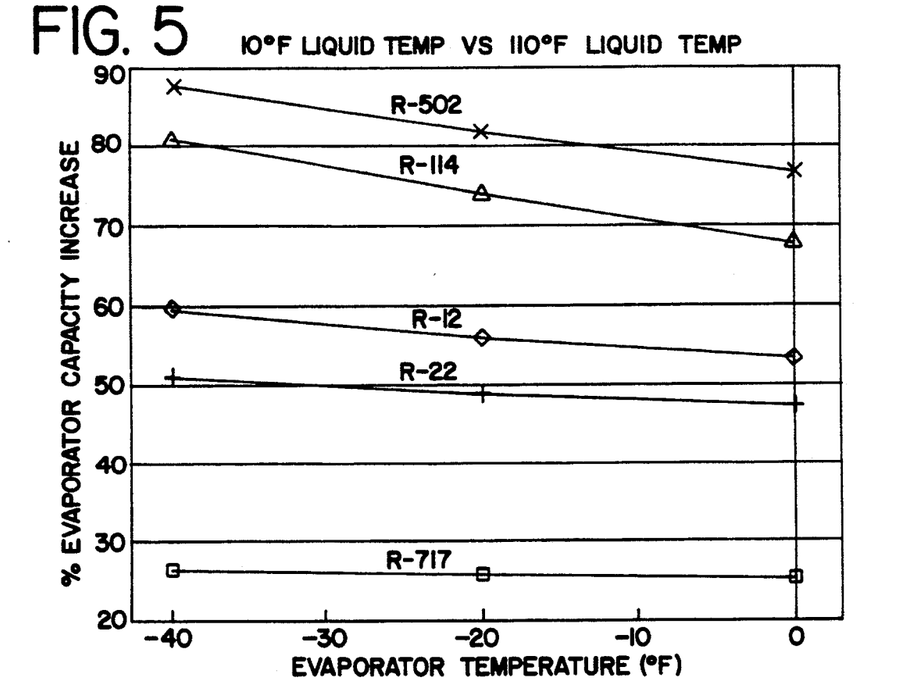
FIG. 5 is a graphical illustration of the percentage increases of evaporative capacity as a function of the changes in evaporator temperature for several representative refrigerants.
Figure 6:
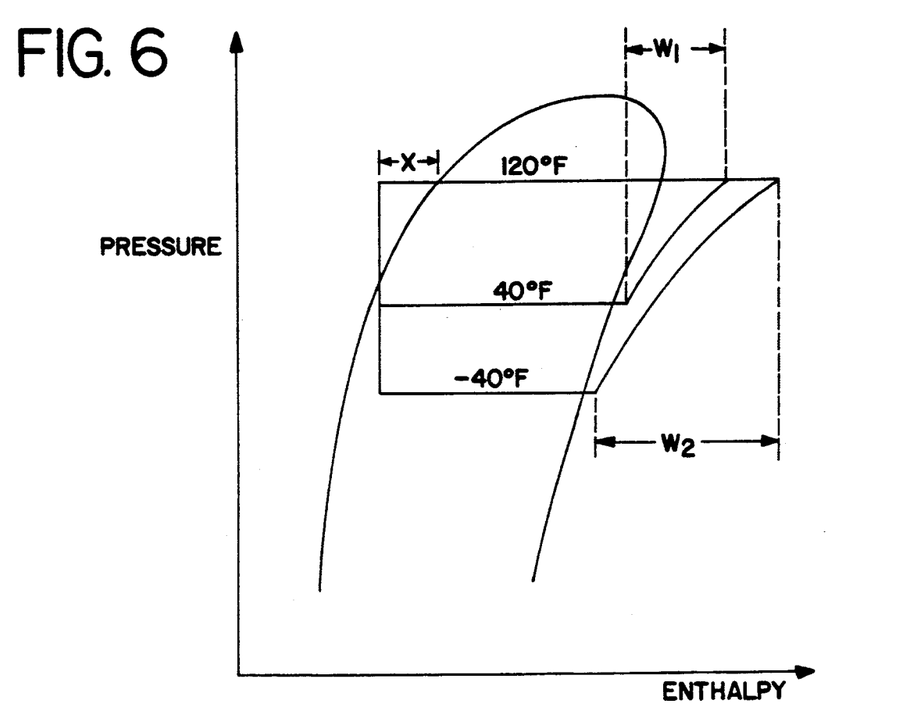
FIG. 6 is a pressure-enthalpy diagram showing the theoretical increase of compression work as evaporator temperature decreases for constant condensing and subcooling conditions.
Figure 7:
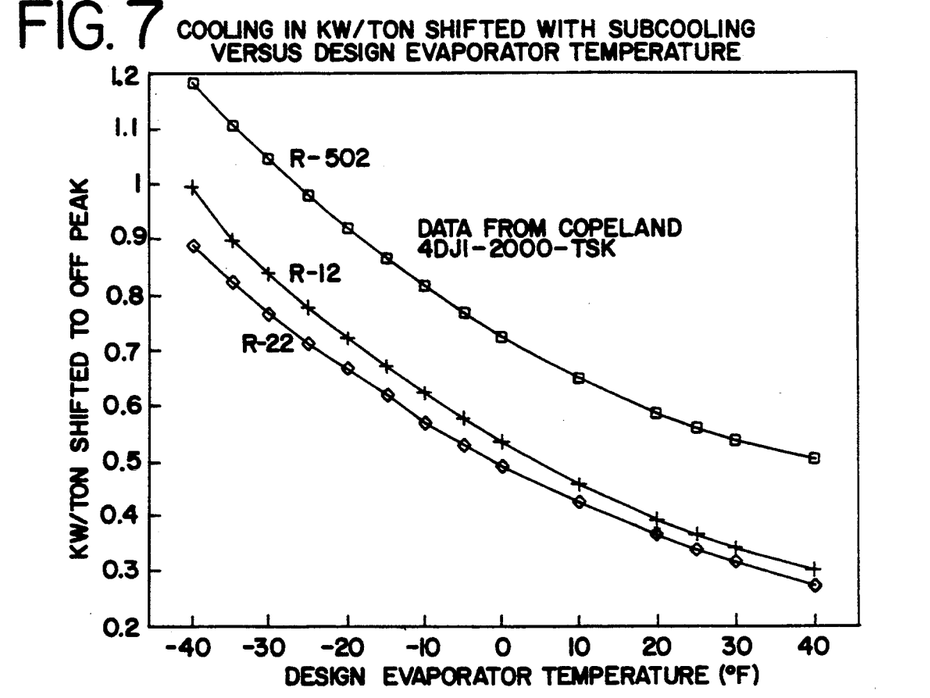
FIG. 7 is a graphical illustration of reduction of input energy per ton of cooling capacity for several alternative refrigerants as a function of design evaporator temperature utilizing the present invention.

The above-noted liquid refrigerant subcooling apparatus 36 may be any known heat exchange type equipment operable with liquid-liquid heat exchange, as this is not a limitation to the present invention. Further, the absolute value of the improvement in evaporator capacity may vary for different refrigerant fluids, which improvements are generally quite noticeable and positive, as shown by the graphs in FIGS. 5 and 9. In FIG. 5, the percentage increase in evaporator capacity as a function of the design evaporator temperature, that is the refrigerant temperature in the evaporator is illustrated for several commercially available refrigerants. The percentage improvement in evaporator capacity is clearly apparent, and consequently the advantage of operating a cooling system, such as refrigerant circuit 12 in FIG. 1 is likewise apparent. FIG. 6 is a P-H (Pressure-Enthalpy) diagram showing the theoretical increase in the work by a compressor as the evaporator temperature decreases, with a relatively constant condensing temperature. At a constant condensing temperature, and with constant subcooling, as noted by the distance 'x', it is noted that as the evaporator temperature is reduced the compressor work increases, which is a common trait for all refrigerants. Alternatively, it may be stated that for the same 'amount' of subcooling at a constant condensing temperature, as the design evaporator decreases, the energy saved by use of a subcooler in the refrigerant circuit 12 increases. The reduction of energy consumed by the utilization of subcooling apparatus 36, which is coupled to thermal storage apparatus 14 in refrigerant circuit 12, is further exemplified in FIG. 7, where the shifting of the energy input provided by-thermal storage at the "off-peak" energy cost is noted as increasing as the evaporator (refrigerant) temperature decreases. That is, reduced input energy or increased capacity at the same input energy during peak-demand periods is accommodated by energy acquired at off-peak hours by the user of refrigerant circuit 12, when it is coupled to thermal storage system 14. FIG. 7 graphically shows the improvements for three different refrigerants.

Figure 8:
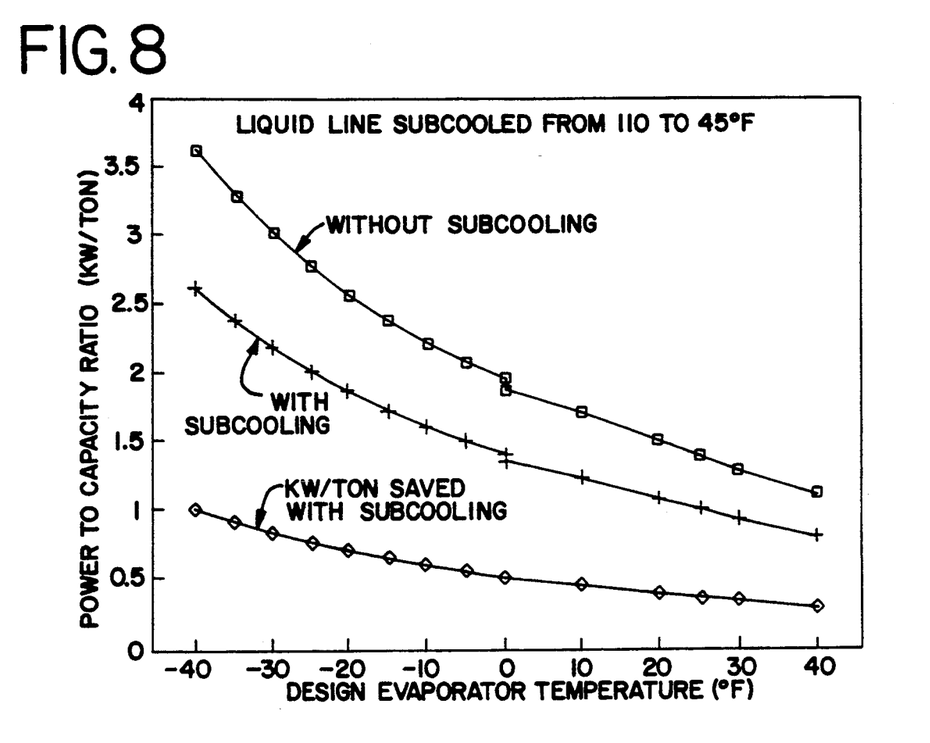
FIG. 8 is a graphical illustration of the increase in input energy required as design evaporator temperature decreases for a particular compressor with and without subcooling.

A further factor demonstrating the improved efficiency of a refrigerant circuit operating with a subcooled and thermal storage system is demonstrated by data from a commercially available compressor, a Copeland Discus compressor, at a constant condensing temperature, as shown in FIG. 8. These several graphs and plotted data are intended to clearly and graphically illustrate the energy benefits, which are translatable into economic, that is monetary, savings to the operator of these systems. In this sense, the operator can acquire an improved, that is arguably a larger refrigerating system without a large capital investment to achieve a proportionally greater cooling capacity, and further, the user will continue to gain the benefit of off-peak energy usage or require less energy input for the same cooling capacity. These economic impacts are shown in FIG. 8, where the operating power to capacity ratio is plotted as a function of design evaporator temperature for operation of a refrigeration circuit without subcooling, with subcooling and the cost improvements associated therewith. As the evaporator temperature decreases, the noted capacity ratio increases for both conditions, that is with and without subcooling. The improvement or savings with reduced design evaporator temperature is also increased as the evaporator temperature decreases.

Figure 9:
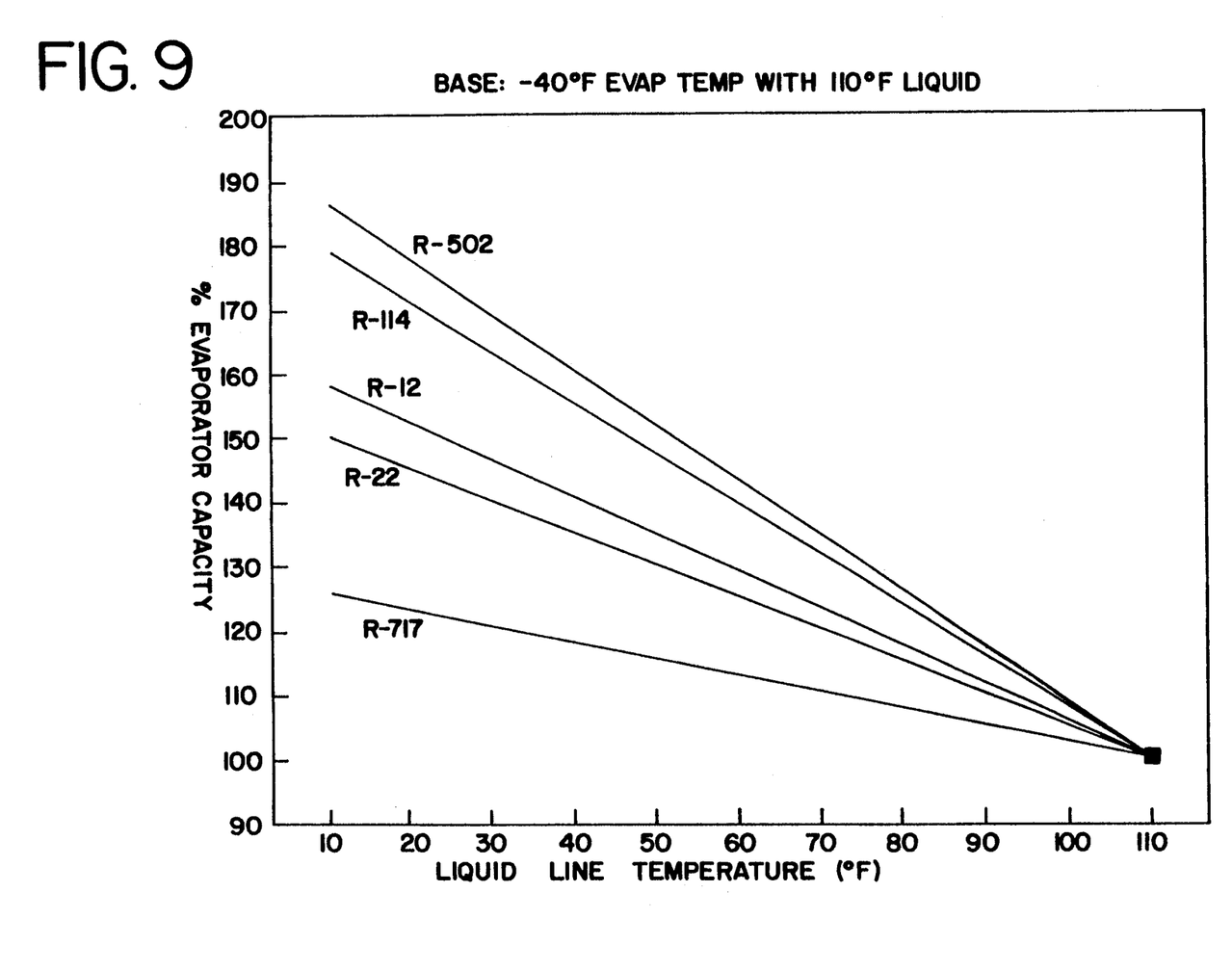
FIG. 9 graphically illustrates the linear proportionality between liquid line temperature and evaporator capacity for various refrigerants.

The fundamental benefits of utilizing the proportional subcooling of the present invention are shown in FIG. 9, as the percentage increase in evaporator capacity, as a function of the decrease in liquid refrigerant temperature, is noted as a linearly proportional inverse function. In its simplest terms, as the temperature of the liquid refrigerant supplied to evaporator 20 goes down for any of the five noted refrigerants, the percentage increase in evaporator capacity is linear. The precise slope of the linear change for each individual refrigerant is different, but the resultant effect is always generally the same.

In FIG. 2, thermal storage system 14 is coupled to a plurality of refrigerant utilizing systems, which are shown as low-temperature apparatus 60, moderate or medium temperature apparatus 70, high-temperature apparatus 80 and "air-conditioning" equipment 90. In these illustrations, each apparatus has a refrigerant circuit with at least one evaporator, compressor, condenser and expansion device, as well as a heat exchanger or subcooler coupled to its refrigerant circuit. Each of the subcoolers of the individual circuits are labelled as subcooler 36, although the particular design, model or type of subcooler is not a limitation to the invention or its operation. For example, parallel flow and counterflow are heat exchange and subcooling apparatus known in the art. The structures and operation of each of apparatus 60, 70, 80 and 90 are similar with the exception of their nominated temperature descriptions. Therefore, only low-temperature apparatus 60 will be described in detail, but it is considered that the description also applies to apparatus 70, 80, and 90.

Apparatus 60 in FIG. 2 has a refrigerant circuit 100 with at least first evaporator 102, but is shown with second evaporator 104 is coupled in parallel, and it is considered that the circuit may have any plurality of evaporators similarly parallel coupled in this refrigerant circuit 100. A compressor bank 106, which has at least one compressor, is shown with parallel connected compressors 108, 110, 112 and 114, which compressor bank 106 is serially coupled downstream to parallel connected evaporator 102 and 104 by common conduit, header or manifold 116 to communicate refrigerant fluid, which is usually low-pressure vapor, to the one or several compressors in bank 106. Compressors 108, 110, 112 and 114 compress the refrigerant vapor to a higher pressure and discharge the compressed fluid vapor to second manifold or conduit 118 for communication to condenser 120 through conduit 122. In FIG. 2, refrigerant circuit 100 may have a receiver 124, which is coupled downstream of condenser 120 to receive condensed liquid refrigerant ahead of subcooler 36. In this embodiment, an optional three-way valve 126 is coupled to subcooler 36 to selectively control refrigerant flow to any of expansion devices, such as a thermal expansion valve (TXV), 32 and subcooler 36. As shown in FIG. 2, subcooler 36 is connected to conduit 128 upstream of expansion device 32 to communicate refrigerant flow therefrom to expansion device 32 and evaporators 102 and 104. The amount of refrigerant flow through optional flow-control valve 126 is used to control the degree of subcooling.

Subcooler 36 is also coupled to thermal storage system 14 by conduit 130 at discharge outlet 41 with pump 40 interposed in the line to pump media fluid, which may also be a slush-like material mixture of liquid and solid media, to conduit 42 extending through subcooler 36 in a counterflow to refrigerant fluid flow in the illustrated subcooling structure. The "amount" of subcooling in this low-temperature apparatus is controllable by the proportion of liquid refrigerant communicated to subcooler 36 by three-way valve 126. In this manner, the amount of subcooled refrigerant to and through subcooler 36 is or may be mixed with a portion of refrigerant directly communicated to conduit 128 for transfer to expansion devices 32 and, evaporators 102 and 104. Thus, proportional control of refrigerant fluid at a predetermined or calculated temperature is communicated to the refrigerant circuit 100.

In an alternative embodiment, an optional control valve 132 is shown in media return conduit 134 downstream of subcooler 36 and upstream of return port 46, which valve 132 may be operable to either open communication to and through subcooler 36 or open media fluid flow and control the rate of flow of the fluid media through subcooler 36. This latter condition would allow control of the subcooling of refrigerant fluid by subcooler 36. Valve 132 may be positioned in a plurality of locations in the media flow circuit to control fluid flow. In addition, pump 40 may be a variable speed or multispeed pump to control water flow rate through subcooler 36.

Similar structures are shown for moderate-temperature refrigerant apparatus 70 and high-temperature refrigerant apparatus 80 and 90, in FIG. 2, the refrigerant circuits of each apparatus 70, 80 and 90 are individually operable but the associated subcoolers 36 are coupled to thermal storage system in parallel with subcooler 36 of apparatus 60, which allows individual and proportional control of refrigerant fluid temperature to each of the separate apparatus 60, 70, 80 and 90 subcoolers. However, air-conditioning apparatus 90 has a refrigerant circuit 150 with subcooler 36 coupled upstream of evaporator 152 and downstream of condenser 154. In this illustration, thermal storage system 14 is coupled to an optional full or partial storage coil 156 by conduit 158 with a pump 160 and optional valve 162 therein for communication of media fluid to coil 156. In this illustration, pump 160 may be similar to pumps 40 in each of the above-noted refrigeration circuit apparatus. Subcooler 36 of air-conditioning apparatus 90 is coupled to inlet conduit 158 ahead of storage coil 156 and downstream of return conduit 164 coupled to thermal storage system 14 for return of media fluid from storage coil 156 to storage system 14. Storage coil 156 is an optional arrangement in apparatus 90 to accommodate flow of media fluid directly to cooling coil 156.

A further embodiment is shown in FIG. 3 with refrigerant circuit 170 coupled to subcooling coil or subcooler 172 in vessel 16 of thermal storage system 14. Refrigerant circuit 170 includes evaporator 174, compressor 176 and condenser 178, which are respectively connected in series by conduits 180, 182 and 184. Each of evaporator 174, compressor 176, condenser 178 and thermal storage system 14 include inlet and outlet ports for receiving and discharging fluids from these components, as these are common elements known in the art they have not been specifically noted on the figures. A receiver 179 downstream of condenser 178 is shown in dashed outline, as it is an optional component that may be utilized in some applications, but is not requisite for illustration of the present invention. Subcooling coil 172 is positioned in thermal storage vessel 16 and is connected to conduit 184 between condenser 178 in conduit 184 by inlet conduit 188 and return conduit 190 for selective diversion and subcooling of refrigerant fluid of circuit 170. A valve arrangement 194 in conduit 184 between condenser 178 and expansion device 192 upstream of evaporator 174 is operable to divert the refrigerant flow either totally or in part through subcooler 172 for heat exchange and temperature reduction of refrigerant fluid in vessel 16.

Valve arrangement 194 may only include valves 196 and 214, which are shown as solenoid operated valves connected by line 198 and 205, respectively, to signal source 200, which is operable to provide a signal through line 205 to actuate solenoid valve 206 to open or close, to proportionally control flow through conduit 188 and thus to subcooling coil 172. Signal source 200 is coupled to a sensor 202 by conduit 204 and may be responsive to a signal from sensor 202 to actuate solenoid valve 196 and 214. Alternatively, solenoid valves 196 and 214 can be operable as one three-way valve. The sensed signal may be any parameter, as for example time, temperature or a line pressure, the chosen parameter, or parameters, is a design choice. As an optional arrangement and to provide more flexibility to the subcooling arrangement a second solenoid operated valve 206 is shown in conduit 184 and is also coupled to signal apparatus 200 by line 205 to receive a signal in response to a sensed signal, such as that provided by sensor 202, to control flow through conduit 184. In this latter arrangement, valve 206 may be a flow control valve to provide proportional subcooling or it may operate to seal conduit 184 to divert all refrigerant condensate through conduit 188 and subcooling coil 172 in vessel 16 for return to conduit 184 downstream of valve 206. In addition, valve 206 may be operable to be normally open to provide refrigerant flow through conduit 184 only, to thus avoid subcooling coil 172. In fact, it is possible to operate both evaporators 210 and 174 simultaneously with or without subcooling the refrigerant condensate in coil 172. The combinations of flow arrangements are only limited by the conditions desired by the operator, as at least one of the valves may operate to modulate the flow in the conduits.

In FIG. 3, a thermal storage coil or evaporator coil 210 in vessel 16 is coupled between conduits 184 and 180 by conduits 183 and 185, respectively, in parallel with evaporator 174. Expansion device 212 is serially arranged downstream of solenoid operated valve 214 and upstream of coil 210. In this arrangement, solenoid operated vavle 214 is coupled to signal source 200 by line 203 for actuation of valve 214 to divert refrigerant fluid through coil 210 and vessel 16 to freeze or chill thermal storage media in vessel 16, generally, but not limited to, periods of minimal or nonuse of evaporator 174. In practice, valve 196 would allow flow to evaporator 174 during those periods of fluid refrigerant diversion to coil 210, however, it is apparent that valve 196 can be sealed to divert flow to coil 210 during a thermal storage cycle or operation. In this and other embodiments of the present invention, the precise type of control valve, such as solenoid operated valve, slide valve, flow control valve or other valve is not a limitation to the present invention. Similarly signal source 200 may be any of known types of signal sources, including but not limited to timers, a computer-operable device operable to receive sensed signals and communicate actuation signals in response to these sensed signal, which computer-type operators are known and utilized in control circuits such as home thermostats and automobile control circuits. As these devices are known and operable in the art, and are schematically illustrated in FIGS. 1 and 3, the specific connections between the valves, pumps and signal apparatus 48 and 200 are not repeated in FIGS. 2, 4, 10 and 11. These similar devices are actuable in response to signals from sensors such as sensors 50 and 202, which may be timed events, sequential events or other sensed operating parameters or other design choices.

Illustrative of the plurality of operational variants for the plurality of valves in FIG. 3 are the modes charted below for valves 206, 214 and 196 in positions or functions, such as open, closed or modulating. A brief description of the resultant positioning or arrangement of the valves for each mode is noted in the last column of this chart.

| MODE | VALVE NUMBERS | | | DESCRIPTION OF MODE |
|---|---|---|---|---|
| | 206 | 214 | 196 | |
| 1 | OPEN | CLOSED | OPEN | COOLING CIRCUIT OPERATING WITH NO SUBCOOLING, CONSERVES THERMAL STORAGE MEDIA DURING LOW-DEMAND PEAK PERIODS, ONLY EVAPORATOR 174 IS ACTIVE |
| 2 | MODULATE | CLOSED | OPEN | COOLING WITH PROPORTIONAL SUBCOOLING, SYSTEM CAPACITY IS MATCHED TO EVAPORATOR LOAD, ONLY EVAPORATOR 174 IS ACTIVE |
| 3 | CLOSE | CLOSE | OPEN | COOLING WITH FULL SUBCOOLING, DURING PEAK PERIODS, MAXIMUM SYSTEM CAPACITY AT MINIMUM ENERGY INPUT, EVAPORATOR 174 IS ACTIVE |
| 4 | CLOSE | OPEN | CLOSE | RECHARGING THERMAL STORAGE SYSTEM WITH FULL SUBCOOLING. SUBCOOLING TO AID STEADY OPERATION OF DEVICE 212. ONLY REFRIGERANT COIL 210 IS ACTIVE |
| 5 | OPEN | OPEN | CLOSE | RECHARGING THERMAL STORAGE UNIT WITH NO SUBCOOLING, ONLY REFRIGERANT COIL 210 IS ACTIVE |

-continued

| MODE | VALVE NUMBERS | | | DESCRIPTION OF MODE |
|---|---|---|---|---|
| | 206 | 214 | 196 | |
| 6 | OPEN | OPEN | OPEN | RECHARGE THERMAL STORAGE UNTIL AND COOL WITH NO SUBCOOLING, DURING LOW-DEMAND PEAK PERIODS, REFRIGERANT COIL 210 AND EVAPORATOR 174 ARE ACTIVE |
| 7 | CLOSE | OPEN | OPEN | RECHARGE THERMAL STORAGE UNIT AND COOL WITH FULL SUBCOOLING, REFRIGERANT COIL 210 AND EVAPORATOR 174 ARE ACTIVE |
| 8 | MODULATE | OPEN | OPEN | RECHARGE THERMAL STORAGE UNIT AND COOL WITH PROPORTIONAL SUBCOOLING, MATCHES SYSTEM CAPACITY TO EVAPORATOR LOAD WHILE DOING BOTH OPERATIONS, REFRIGERANT COIL 210 AND EVAPORATOR 174 ARE ACTIVE |
| 9 | MODULATE | OPEN | CLOSED | RECHARGE THERMAL STORAGE UNIT WITH PROPORTIONAL SUBCOOLING, A SMALL AMOUNT OF SUBCOOLING AIDS STEADY OPERATION OF DEVICE 212, REFRIGERANT COIL 210 IS ACTIVE |

Figure 10:
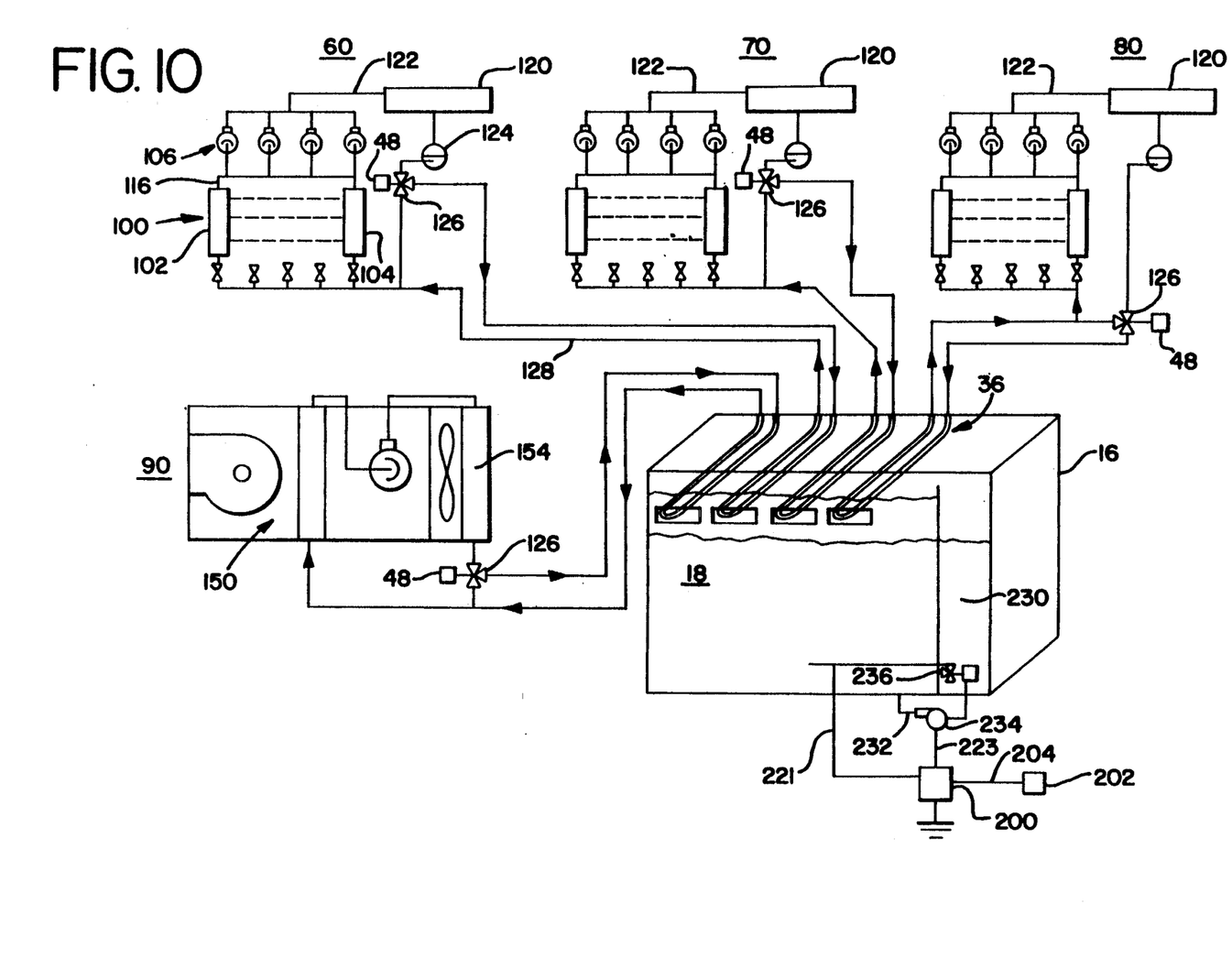
FIG. 10 is a schematic illustration of an alternative embodiment of the present invention with the subcooling arrangement provided in the thermal storage system.

In another embodiment, the plural apparatus arrangement of FIG. 2 is shown in FIG. 10 with subcooling coils of each apparatus 60, 70, 80 and 90 provided in thermal storage vessel 16, which obviates the requirement for pumps 40 and the connecting components to communicate media fluid to subcoolers or subcooling coils 36. In these several apparatus, refrigerant condensate flow from each of refrigerant circuits 60, 70, 80 and 90 is divertable to its associated subcooler coil in vessel 16 by three-way valve 126. In these apparatus of FIG. 10, optional control valves 132 and pumps 40, as well as the associated conduits and signal source connecting lines, which were shown in FIG. 2, are not required. Operation of valves 126 may be accommodated by coupling to a signal source, such as source 48 or 200, by separate lines to actuate the valves and divert or modulate refrigerant fluid flow to subcooling coil 36 in vessel 16 for each of the separate apparatus 60, 70, 80 and 90 to accomplish control subcooling and hence control of apparatus capacity.

The preferred operating method to achieve subcooling or various degrees of subcooling of refrigerant fluid in the several apparatus 60, 70, 80 and 90 would provide the subcooling coils 36 or devices continually immersed in the thermal storage media of vessel 16. Alternatively, vessel 16 may include a diverter chamber 230 coupled to cavity 18 by conduit 232 with pump 234 therein. In this embodiment, subcooling coils 36 are located in vessel cavity 18 at a position above the media in cavity 18 at a reference position. Media fluid in chamber 230 may be pumped to cavity 18 to elevate the media level in cavity 18 to submerse coils 36, either in whole or in part, and thus provide for subcooling or various degrees of subcooling refrigerant fluid flowing through these coils. In this embodiment, refrigerant fluid flow may be continuously provided through the coils 36 without the necessity of valves 132 in FIG. 2 or valves 126 in FIG. 10. In FIG. 10, pump 234 is coupled to and actuable by signal source 200 through line 223 to communicate fluid from chamber 230 to cavity 18. Return of fluid media to chamber 230 is accommodated by solenoid operated valve 236 coupled to signal source 200 by line 221 for actuation to return fluid media to chamber 230. In this embodiment, the "amount" of subcooling may be controlled by the depth of immersion of fluid media coverage of subcooler coils 36 in cavity 18. Apparatus 90 may be a full or partial storage system where thermal media is pumped to and from coil 156.

Figure 4:
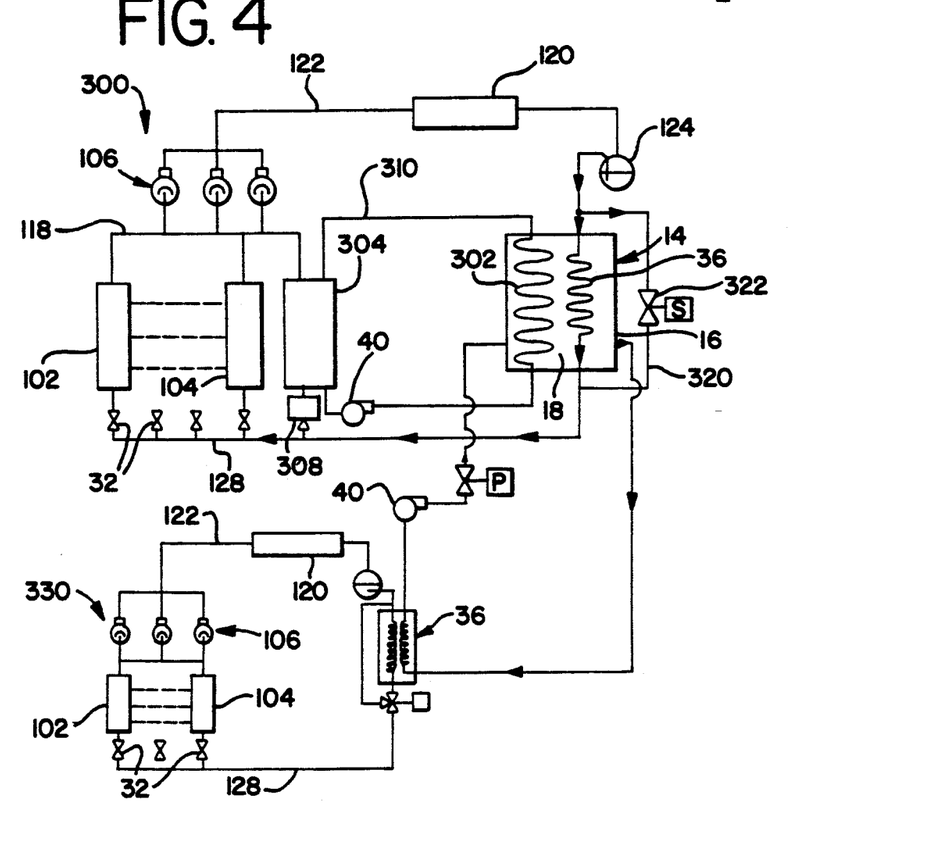
FIG. 4 is a schematic illustration of a thermal storage vessel with at least one subcooler coil in the storage vessel along with the capacity to provide storage fluid to other connected subcoolers.

In the alternative embodiment shown in FIG. 4, a subcooling and thermal storage arrangement are shown for equipment which may not be able to incorporate direct expansion apparatus in the thermal storage coil. In this illustration, the upper or primary circuit arrangement 300 has compressor bank 106, first and second evaporators 102 and 104, condenser 120, expansion devices 32 and the several noted conduits 118, 122, and 128. Thermal storage unit 14 with subcooling coil 36 in cavity 18 and refrigerant coil 302, which is in housing 16 to chill or freeze media in cavity 18. In this assembly 300, a heat exchanger 304, such as a shell and tube exchanger, is coupled to refrigerant circuit 300 in parallel with evaporators 102 and 104 and its own control valve/expansion device 308 to open communication of condensate refrigerant from subcooler 36 or condenser 120 and conduit 128 to heat exchanger 304. A second conduit loop 310 is coupled between heat exchanger 304 and refrigerant coil 302 and has a second refrigerant fluid, such as a glycol mixture, to be cooled in heat exchanger 304 by the expanding first refrigerant and to chill the media in cavity 18 as the second refrigerant passes through refrigerating coil 302. A pump 40 is provided in loop conduit 310 to pump the second refrigerant in loop 310.

Optional receiver 124 is again provided in primary circuit 300, however, a bypass loop 320 with solenoid or proportionally operated valve 330 is coupled around subcooler coil 36 and is operable to communicate condensate fluid to conduit 128 and expansion devices 32 and 308. A fluid circuit 330, which is similar to circuits 60, 70 and 80, is connected to and operable with thermal storage unit 14, and this fluid circuit 322 is operable simultaneously with or independently to circuit 300.

In this embodiment, the refrigerant fluid from circuit 300 is operable to provide the thermally stored fluid media in cavity 18. Generally this chilled or frozen media would be provided on the off-peak hours of operation. This style or arrangement of components finds particular application with a retrofittable system. However, the pumps and solenoid or proportionally operated valves shown in this structure are couplable to signal sources, such as signal sources 48 and 200 in FIGS. 1 and 3, for actuation by such apparatus. It should be noted that expansion device could feed refrigerant directly into coil 302 for applications supporting direct expansion.

Figure 11:
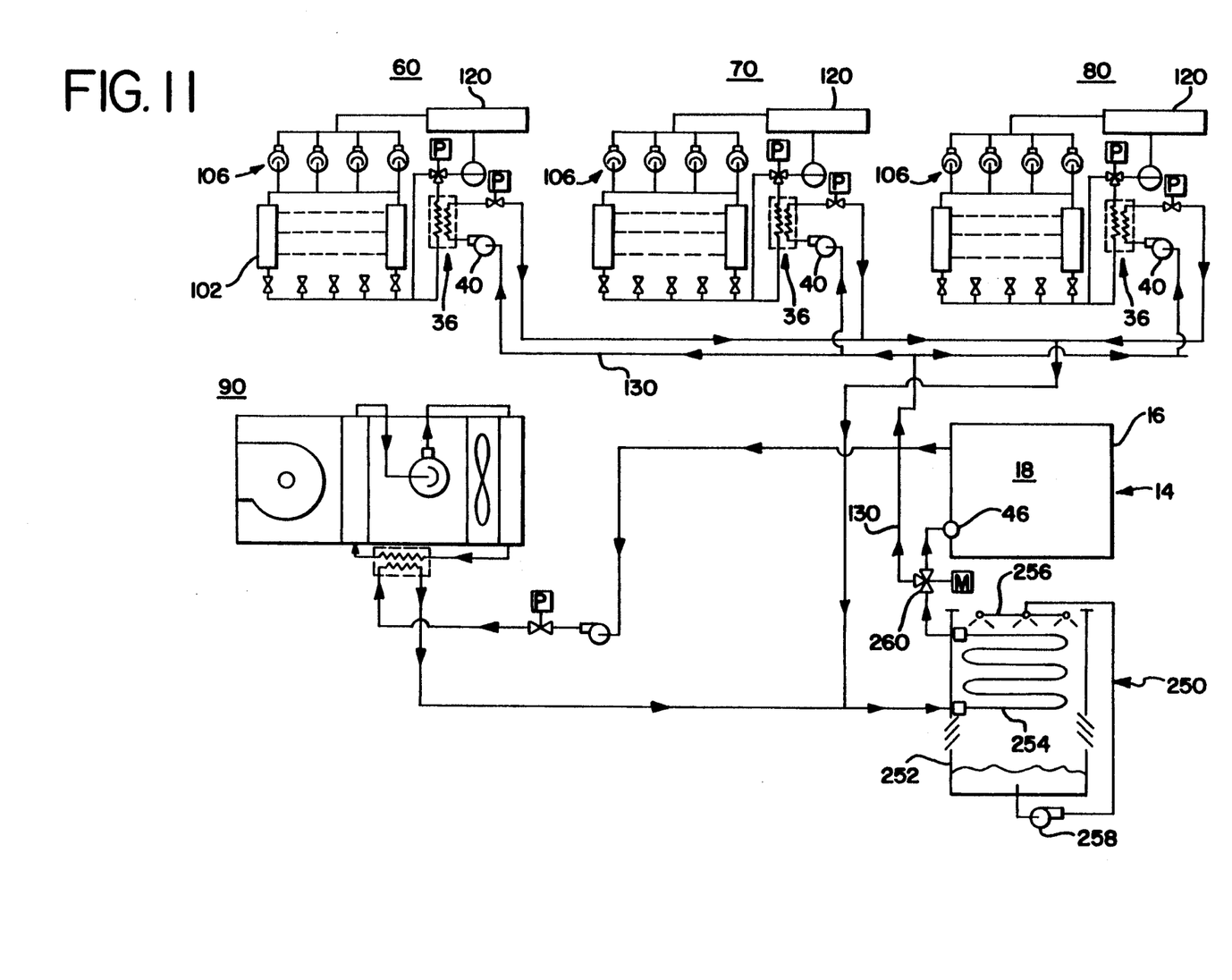
FIG. 11 is a schematic illustration of a fluid cooler or other low-temperature reservoir apparatus, and a thermal storage system to provide fluid to a subcooling arrangement, as noted in FIG. 2; and, FIG. 12 is an alternative embodiment of the apparatus of FIG. 3, where the thermal storage is charged by the cooled medium.

In a further embodiment shown in FIG. 11, a fluid cooler, ground water source or cooling tower 250 may be serially arranged between apparatus 60, 70, 80 and 90 and thermal storage structure 14 of FIG. 2. In this illustration, the media fluid is again directed from thermal storage system 14 to subcoolers 36 of each of the noted refrigerant and air-conditioning apparatus. However, the media fluid returning by conduit to thermal storage system 14 is passed through serially arranged fluid cooler or cooling tower 250 to reduce the media temperature ahead of vessel 16 and thus reduce the requisite size of thermal storage vessel 16 and also its capital and operating cost. Operation of fluid cooler 250 shown in the art but is illustrated with housing 252, fluid transfer coil 254, spray header 256 and pump 258. In this illustration, cooling water in cooler 250 is sprayed on cooling coil 254 with the media coarsing therethrough before its return to either of conduits 130 for direct recycling to subcoolers 36 supplemented by some of fluid media from vessel 16 or for return to cavity of system 14. Three-way valve 260 coupled between return port 46, conduit 130 and coil 254 is operable to modulate fluid flow to conduit 130 from both of system 14 and fluid cooler 250.

A further embodiment in shown in FIG. 12 with refrigerant circuit 170 coupled to subcooling coil or subcooler 172 in vessel 16 of thermal storage system 14. Refrigerant circuit 170 includes evaporator 174, compressor 176, and condenser 178, which are respectively connected in series by conduits 180, 182, and 184, 191. Expansion device 192 is positioned in conduit 191 upstream of evaporator 174. Subcooling coil 172 is positioned in thermal storage vessel 16 and is connected to conduit 184 between condenser 178 and conduit 184 by inlet conduit 188 and return conduit 190 for subcooling of refrigerant fluid from circuit 170. A valve arrangement 206 placed between conduits 184 and 191 serves to divert some, all, or none of the refrigerant around subcooler 172 for heat exchange and temperature reduction of refrigerant fluid in vessel 16. Valve 206 is connected by line 205 to signal source 200, which is operable to provide a signal to actuate valve 206 in either an open, closed, or modulating position.

Housing 17 around refrigerated medium or space 19 encloses thermal storage system 16, refrigerated medium 19, evaporator 174, subcooler coil 172, heat transfer barrier wall 238 and fan or damper 240 in the same refrigerated structure. Heat transfer barrier wall 238 is positioned to separate thermal storage system 16 from heat transfer to evaporator coil 174 unless fan or damper 240 is operating. Fan or damper 240 is connected by line 195 to signal source 200, which is operable to provide a signal to activate fan or damper 240 in an off, on, or modulating condition to control the time and rate at which thermal storage system 16 will recharge.

Once compressor 176 is cycled off, refrigerated medium 19 is, or should be, at or below a desired temperature or within another desired operating parameter. Thermal storage system 16 will continue to be charged by providing heat transfer to refrigerated medium 19 from thermal storage system 16 by actuating fan or damper system 240. If there is no appreciable load in medium 19, then compressor 176 will cycle on and off only when the load from charging thermal storage system 16 causes a temperature increase or reaction to conform to the other above-noted operating parameter in medium 19.

The sensed signal from sensor 202 to signal source 200 may be any parameter as for example, time or temperature or a line pressure, the chosen parameter or parameters is again a design choice.

The embodiment of FIG. 12, can provide reduced refrigerant charge, elimination of evaporator 210 and conduits 185 and 183, elimination of expansion device 212, elimination of solenoid valves 214 and 196, and a simpler control strategy. This embodiment may find its greatest application in refrigerators or freezers, which can receive a subcooler coil and thermal storage system inside of the conditioned space.

The above-discussed embodiments all provide the ability to simultaneously provide cooling in the refrigerant circuits while recharging the thermal storage system. This is illustrated in FIGS. 1, 2, 10, and 11 as they all utilize stand-alone, ice thermal storage systems or other low-temperature reservoirs in the specific illustrations.

The embodiments of FIGS. 3, 4 and 12 accomplish this goal as the thermal storage charging means of the refrigerant circuit is connected in parallel with the cooling evaporator to provide the requisite in the thermal storage system. In these embodiments, simultaneous recharging is available when the evaporator load to be cooled is at or below the total cooling system capacity less the load generated during the recharging. In addition, the embodiments of FIGS. 3, 4 and 12 are operable to cease, or reduce the rate of, thermal storage recharging without affecting the operation of the cooling refrigerant circuit. In these figures, a plurality of compressors may be added in parallel with the existing compressors to allow excess compressor capacity to charge the thermal storage system and to serve as a back-up unit for any failed or inoperative compressor.

While only specific embodiments of the invention have been described and shown, it is apparent that various alterations and modifications can be made therein. It is, therefore, the intention in the appended claims to cover all such modifications and alterations as may fall within the true scope and spirit of the invention.

I claim:

1. An assembly for subcooling liquid condensate of a refrigerant fluid in a refrigerant circuit to provide increased refrigerant-circuit thermal capacity and efficiency, said refrigerant circuit having at least one apparatus operable to refrigerate at least one of a material and volume, said assembly comprising:

thermal storage media, said storage media being one of a chilled fluid and a combination of chilled fluid and frozen material;

means for storing said storage media, said storing means having a housing, said storage media in said housing, said at least one refrigerant-operable apparatus having means for condensing said refrigerant fluid to a condensate, said condensate having a first temperature downstream of said condensing means;

means for coupling;

means for heat exchanging for each said apparatus, each said heat exchange means coupled to said refrigerant circuit by said coupling means for communication of said downstream condensate at said first temperature through said heat exchange means and for return to said refrigerant circuit at a second temperature lower than said first temperature;

said thermal storing means coupled to said heat exchange means by said coupling means;

means for pumping said one of chilled fluid and said combination of chilled fluid and frozen material of said storage media, which storage media is at a third temperature less than said condensate first temperature, said pumping means coupled between said means for thermal storing and said heat exchange means, and operable to communicate said one of said chilled fluid and, said chilled fluid and frozen material to said heat exchange means to reduce said refrigerant condensate temperature to said second and lower temperature in said heat exchange means, said one of said chilled fluid and combination of chilled fluid and frozen material downstream of said pump and said heat exchange means communicated to said housing by said coupling means; and, means for recharging said thermal storage means, said recharging means operable to reduce said media temperature below said first condensate temperature upstream of said heat exchanger.

2. An assembly for subcooling as claimed in claim 1, wherein said means for heat exchanging is a subcooler.

3. An assembly for subcooling as claimed in claim 2, wherein said subcooler is a counterflow heat exchanger.

4. An assembly for subcooling as claimed in claim 2, wherein said subcooler is a parallel flow heat exchanger.

5. An assembly for subcooling as claimed in claim 2, wherein said subcooler is a cross-flow heat exchanger.

6. An assembly for subcooling liquid condensate of a refrigerant fluid in a refrigerant circuit as claimed in claim 1, said refrigerant circuit further comprising a plurality of apparatus operable with a refrigerant fluid, said assembly for subcooling connected for subcooling said refrigerant fluid to each said apparatus by said coupling means.

7. An assembly for subcooling liquid condensate as claimed in claim 6, wherein said plurality of apparatus has least one refrigerant apparatus and an air-conditioning apparatus.

8. An assembly for subcooling liquid condensate of a refrigerant circuit as claimed in claim 1, which refrigerant circuit is at least one of a refrigeration apparatus and an air-conditioning apparatus.

9. In a cooling and heat exchange system having at least one refrigerant circuit with a refrigerant fluid and, operable at a first fluid flow rate and a reference evaporator capacity, each said refrigerant circuit having means for evaporating, means for compressing a refrigerant fluid, means for condensing said refrigerant fluid to a condensate at a first temperature downstream of said condensing means, means for expanding said refrigerant fluid condensate, and means for conducting said refrigerant fluid, said conducting means coupling said evaporating means, said compressing means and said condensing means in said refrigerant circuit, and means for subcooling said condensate at said first temperature to provide refrigerant fluid condensate to said expansion means at a second temperature less than said condensate first temperature, said subcooling means comprising:

a subcooler coupled to said refrigerant circuit downstream of said condensing means by said conducting means to communicate at least a portion of said refrigerant fluid condensate downstream of said condensing means to said subcooler and to communicate said refrigerant fluid from said subcooler to said refrigerant circuit upstream of said expansion means;

a thermal storage media, means for thermal storing said thermal storage media at a second temperature less than said condensate first temperature;

said subcooler positioned in said thermal storage unit and operable to reduce said condensate first temperature communicating through said subcooler to said expansion means to provide one of increased refrigerant circuit evaporator capacity at said reference fluid flow rate and the maintenance of system reference evaporator capacity at a reduced system compressor size.

10. In a cooling and heat exchange system as claimed in claim 9, further comprising means for controlling fluid flow between said means for subcooling and said conducting means.

11. In a cooling and heat exchange system as claimed in claim 10, wherein said means for controlling fluid flow has at least one valve in said conducting means; means for sensing operable to provide a signal; a first line; a signal source coupled to said sensing means by said first line and operable to receive said signal; a second line; said signal source coupled to said at least one valve by said second line and operable in response to said signal to modulate said refrigerant flow through said subcooling means to control said reduced condensate temperature to said expansion device.

12. In a subcooling and heat exchange system as claimed in claim 10, wherein said means for controlling fluid flow has a first valve in said conducting means in parallel with said subcooling means and operable to divert flow to said subcooling means; a first line; means for sensing operable to provide a sensed signal; a signal source coupled to said sensing means by said first line to receive said sensed signal; a second line connecting said signal source to said first valve to communicate an actuation signal to actuate said first valve; a second valve in said conducting means downstream of said first valve and subcooling means; a third line coupled between said signal source and said second valve, which second valve in response to a signal from said signal source is operable to modulate said refrigerant flow through said subcooling means to control said condensate temperature to said expansion device.

13. A subcooling and heat exchange system having at least one refrigerant circuit with a refrigerant fluid and operable at a first fluid flow rate and a reference evaporator capacity, each said refrigerant circuit having means for evaporating, means for compressing a refrigerant fluid with a compressor capacity, means for condensing said refrigerant fluid condensate, and means for conducting said refrigerant fluid, said fluid conducting means operable to couple said evaporator means, said compressing means and said condensing means, and means for providing reduced temperature refrigerant to said expanding means, said system comprising:

means for subcooling coupled to said refrigerant circuit between said condensing means and said expanding means by said conducting means, said subcooling means operable to receive at least a portion of said refrigerant fluid condensate downstream of said condensing means;

said condensate downstream from said condensing means at a first temperature;.

a thermal storage system having a thermal storage housing and thermal storage media in said housing at a second temperature, which is about at a freezing point of said storage media, and less than said condensate first temperature;

second means for conducting coupled between said thermal storage system and said subcooling means to communicate fluid storage media from said thermal storage system to said subcooling means and to communicate said fluid storage media from said subcooling means to said thermal storage housing;

said subcooling means operable to reduce said refrigerant fluid condensate first temperature to a third temperature less than said first temperature and communicate said fluid condensate at said third temperature to said expansion means of said coupled refrigerant circuit at a temperature less than said first temperature to provide said refrigerant circuit one of increased evaporator capacity at said first refrigerant flow rate and the maintenance of about the reference evaporator means capacity at a reduced compressor capacity.

14. A subcooling and heat exchange system as claimed in claim 13 further comprising a pump in said second means for conducting, said pump operable to pump said fluid media through said second means for conducting.

15. A subcooling and heat exchange system as claimed in claim 14 further comprising a plurality of refrigerant circuits; each said circuit having means for subcooling and a pump in said second conducting means coupled to said thermal storage unit, which pump is operable to pump said fluid media through each said subcooling and second conducting means.

16. A subcooling and heat exchange system as claimed in claim 15 wherein at least one of said plurality of refrigerant circuits is an air-conditioning apparatus.

17. A subcooling and heat exchange system as claimed in claim 15 wherein each said refrigerant circuit has means for controlling and selectively diverting refrigerant fluid flow through said means for subcooling and said means for conducting.

18. A subcooling and heat exchange system as claimed in claim 17 wherein said means for controlling and diverting refrigerant flow is a control valve.

19. A subcooling and heat exchange system as claimed in claim 17 wherein said means for controlling is a solenoid-operated valve.

20. A subcooling and heat exchange system as claimed in claim 17 further comprising means for sensing operable to provide a sensed signal, means for connecting, and at least one signal source to provide an actuation signal; said means for sensing connected to said signal source by said connecting means to provide said sensed signal to said signal source;

said connecting means coupling said signal source to said controlling means to communicate said actuation signal to operate said controlling means.

21. A subcooling and heat exchange system as claimed in claim 20 wherein said controlling means in each said circuit is a control valve operable to modulate said refrigerant condensate flow through said subcooling means and said conducting in each said refrigerant circuit.

22. A subcooling and heat exchange system as claimed in claim 13 wherein said fluid media is water.

23. A subcooling and heat exchange system as claimed in claim 13 wherein said fluid media is a mixture of glycol and water.

24. In a cooling and heat exchange system having at least one refrigerant circuit with a refrigerant fluid, and means for subcooling operable to reduce the temperature of said refrigerant fluid from a first temperature to a second temperature, each said refrigerant circuit having means for evaporating said refrigerant fluid, means for compressing said evaporated refrigerated fluid, means for condensing said evaporated refrigerated fluid to a condensate at a first temperature, means for expanding said condensate, and means for conducting said refrigerant fluid, said conducting means coupling said evaporating means, said compressing means, said condensing means and said expanding means for operation in said refrigerant circuit, said refrigerant circuit operable at a first fluid flow rate and a reference evaporator capacity, said subcooling means comprising:

a thermal storage media at a third temperature, less than said condensate first temperature;

means for storing said thermal storage media at a temperature less than said condensate first temperature:

means for recharging said media to said third temperature in said means for thermal storing;

a subcooler coupled by said conducting means to receive at least a portion of said condensate fluid at said first temperature downstream of said condensing means, said subcooler operable to reduce said first temperature of said condensate communicating through said subcooler to said expansion device and, to provide one of increased evaporator capacity at said first reference fluid flow rate and the maintenance of said reference evaporator capacity at a reduced size for said compressing means.

* * * * *